Aug. 28, 1951  C. C. COONS  2,566,171
ABSORPTION REFRIGERATION
Filed Dec. 23, 1947  2 Sheets-Sheet 1

INVENTOR.
Curtis C. Coons
BY Harry S. Dumarsh
ATTORNEY.

Aug. 28, 1951 C. C. COONS 2,566,171
ABSORPTION REFRIGERATION
Filed Dec. 23, 1947 2 Sheets-Sheet 2

INVENTOR.
Curtis C. Coons
BY
Harry S. Demarse
ATTORNEY.

Patented Aug. 28, 1951

2,566,171

UNITED STATES PATENT OFFICE 2,566,171

ABSORPTION REFRIGERATION

Curtis C. Coons, North Canton, Ohio, assignor to The Hoover Company, North Canton, Ohio, a corporation of Ohio Application December 23, 1947, Serial No. 793,345

11 Claims. (Cl. 62—119.5)

This invention relates to the art of refrigeration and more particularly to an absorption refrigerating machine of the type designed to provide a special refrigerating zone which operates at temperature levels sufficient to insure the safe preservation of sharp frozen food stuffs.

It is one of the particular objects of the present invention to provide means whereby the low temperature evaporating zone of a three fluid type absorption refrigerating system is supplied with highly purified liquid refrigerant and inert gas stripped to a very low refrigerant content and relieved of entrained absorbing solution vapor.

It is a further object of the present invention to provide a three fluid absorption refrigerating machine characterized by the provision of two inert gas circuits, which function in different concentration ranges, provided with common gas circulating means.

It is a further object of the present invention to provide a three fluid absorption refrigerating apparatus having inert gas circuits which circulate in high and low temperature refrigerating zones in which both bodies of inert gas are circulated by a common medium and are otherwise substantially segregated from each other.

Other and further objects and advantages of this invention will become apparent as the description proceeds when taken in connection with the accompanying drawings in which.

Figure 1:
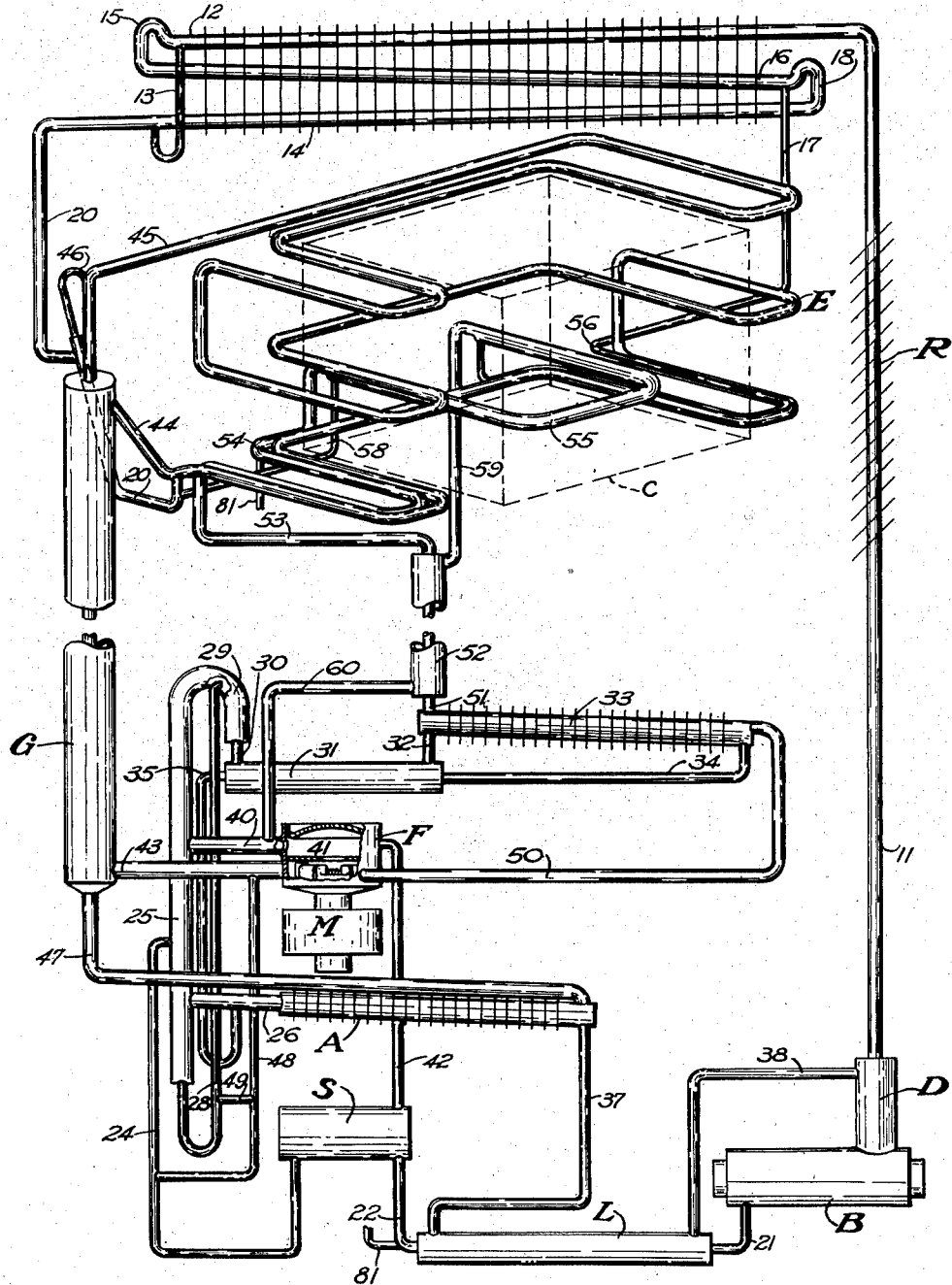
Figure 1 is a schematic view of a refrigerating apparatus embodying the present invention.

Referring now to the drawing in detail and first to Figure 1 thereof, the reference character B indicates a boiler in which a solution of refrigerant and absorbent, for example ammonia in water, is subjected to heat to liberate refrigerant vapor. Refrigerant vapor so liberated passes upwardly through the analyzer D in intimate contact with enriched solution supplied to the analyzer in a manner to be hereinafter described. This action has the effect of partially reducing the water vapor content of the vapors evolved in the boiler and also of removing some refrigerant vapor from the rich solution entering the analyzer. The resulting vapors flow from the analyzer D through to the conduit 11 which includes the air cooled rectifier R. In the rectifier R the vapors are cooled sufficiently to condense the major portion of the water vapor which they still contain. From the rectifier the substantially dry vapors which still contain a small quantity of absorbing solution vapor enter the upper portion 12 of a tubular air cooled condenser. In this portion of the condenser an appreciable quantity of refrigerant vapor is reduced to the liquid state together with substantially all the remaining water vapor. The condensate formed in the upper section 12 of the condenser is removed from the lower end thereof by a U-shaped gas sealing trap conduit 13 and is conveyed to the bottom portion 14 of the condenser. The substantially pure refrigerant vapor uncondensed in the condenser section 12 is conveyed therefrom through the conduit 15 into the mid-section 16 of the condenser. The condensate formed in the section 16 of the condenser is substantially pure liquid refrigerant having no significant water contamination. The pure liquid refrigerant produced in the mid-section 16 of the condenser is removed therefrom through a conduit 17 to a low temperature evaporator in a manner to be described more fully hereinafter. The vapors which pass through the condenser section 16 uncondensed are conveyed therefrom through the conduit 18 to the lowest section 14 of the condenser wherein these vapors are ultimately reduced to the liquid state except for such non-condensible gases as may be present. The condensate formed in the condenser 14 and the condensate supplied thereto through the conduit 13 are conveyed to the principal evaporator through a conduit 20 as will be more fully described hereinafter.

The lean absorbing solution produced in the boiler assembly by the evolution of refrigerant vapor is removed therefrom to the solution reservoir S by the conduit 21, the inner passage of the liquid heat exchanger L and the conduit 22. The lean absorbing solution is removed from the reservoir S by the gas lift pump conduit 24 which discharges into the vertically extending gas conduit 25. A major portion of the solution flows from the lower portion of the gas conduit 25 into the primary absorber A through the absorber gas discharge conduit 26. The remaining portion of the absorbing solution supplied to the gas conduit 25 is withdrawn therefrom by the gas lift pump conduit 28 and elevated into a high level downwardly extending leg 29 of the gas conduit 25. The elevated lean solution flows from the chamber 29 through a conduit 30, liquid heat exchanger 31 and a conduit 32 into the upper end of a low temperature secondary absorber 33.

The solution flows downwardly through the secondary absorber 33 by gravity and has its refrigerant content increased as will be described hereinafter. The somewhat enriched absorbing solution flows from the bottom of the absorber 33 through the conduit 34, the liquid heat exchanger 31 and the conduit 35 which discharges through a gas sealed trap into the absorber gas discharge conduit 26 below the level at which that conduit joins the gas conduit 25. At this point the solution which flows directly from conduit 25 into conduit 26 and the solution diverted from conduit 25 by the pump 28 through the absorber 33 re-join and both flow through the tubular air cooled absorber A by gravity. The absorbing solution is considerably enriched in refrigerant content in the absorber A as will be described hereinafter. The rich solution formed in the absorber A is returned to the analyzer through the conduit 37, the liquid heat exchanger L and the conduit 38 thus completing the solution circuit.

The apparatus is also charged with a pressure equalizing medium, such as nitrogen, which is inert with respect to the refrigerant and the absorbent. The inert gas is caused to circulate by a suitable gas pump, here shown as a centrifugal fan F, which is driven by an electrical motor M. The inert gas flows in two independent circuits which are common to the extent that they both utilize the circulating fan F to cause circulation of the gas through the respective circuits. The primary inert gas circuit, besides the fan F, includes as principal elements the primary absorber A, the gas heat exchanger G and the principal evaporator E. The inert gas discharging from the absorber A has had its refrigerant vapor content reduced to a low value because it has just passed in extensive contact with lean absorbing solution so that the solution could absorb refrigerant from the gas and reject the heat of absorption through the exterior walls of the absorber to the surrounding medium. The lean inert gas flows through the conduit 26, the conduit 25 and enters the suction chamber 41 of the fan F through the conduit 40. A vent conduit 42 for the reservoir S also opens into the chamber 41. The fan places the inert gas under pressure and discharges the same into the gas heat exchanger G through the conduit 43. From the gas heat exchanger the lean inert gas flows through the conduit 44 into the lower portion of the principal evaporator E. The evaporator E per se consists of two laterally spaced groups of vertically spaced U-shaped conduits, adapted to form supporting platforms for ice trays or the like, which are serially connected at each level and between succeeding levels for continuous flow of the inert gas and refrigerant medium. This evaporator construction per se is described and claimed by my co-pending application Serial No. 694,370, filed August 31, 1946, now Patent No. 2,520,530, issued August 29, 1950.

Liquid refrigerant discharging from the condenser flows through the conduit 20 to the evaporator E at the point at which the gas conduit 44 joins the evaporator. This evaporator is of the type in which gas is propelled with sufficient pressure and velocity to conduct and distribute the evaporating liquid refrigerant throughout the evaporator conduit. In the evaporator E the liquid refrigerant vaporizes into the inert gas to produce the primary refrigerating effect which will be utilized for the purpose of freezing water and refrigerating the principal food storage chamber. The inert gas enriched in refrigerant vapor in the evaporator E and any non-vaporizable liquids which may have been supplied to the evaporator flow from the evaporator E to the gas heat exchange G through the conduit 45. A vent conduit 46 is connected between the condenser discharge conduit 20 and the evaporator discharge conduit 45 to relieve the condenser of any non-condensible gases which may flow thereinto. From the gas heat exchanger G the enriched inert gas flows to the lower end of the air cooled absorber A through the conduit 47. The inert gas then flows upwardly through the absorber in counter-flow relation to and in contact with the lean absorbing solution supplied to the upper end of the absorber during which process the solution absorbs refrigerant vapor from the inert gas so that so called lean inert gas leaves the absorber through the conduit 26.

A portion of the inert gas under pressure in conduit 43 is conducted by conduits 48 and 49 into the gas lift pumps 24 and 28, respectively, to provide pumping gas therefor. After performing its pumping function the diverted inert gas discharges into conduit 25 from which it returns to the suction inlet of the pump F.

A gas conduit 50 withdraws inert gas under pressure from the fan chamber and conducts such gas to the lower end of the low temperature secondary absorber 33. The low temperature absorber 33 is preferably placed in the lower rear corner of the refrigerator cabinet to be refrigerated ultimately by the principal evaporator E (see Fig. 2). Due to the fact that the absorber 33 is maintained at a temperature approximating that prevailing in the principal food storage compartment of the refrigerator, the lean absorbing solution supplied to the upper end thereof through the conduit 32 is capable of absorbing an appreciable quantity of refrigerant from the gas supplied through conduit 50. Due to the very low temperature at which the absorber 33 is maintained the inert gas is reduced to an extremely low refrigerant content substantially below the refrigerant content of the inert gas discharged from the absorber A. The highly stripped inert gas flows from the absorber 33 through the discharge conduit 51 into a secondary gas heat exchanger 52. The inert gas is further reduced in temperature in the gas heat exchanger 52 and it is then conducted through the conduit 53 in intimate heat exchange relationship with the lowermost left hand, as viewed in Fig. 1, U-shaped tray supporting conduit of the principal evaporator E in the manner indicated at 54. In this conduit the inert gas is further reduced to a low temperature and entrained absorbing solution vapor is condensed. The condensed solution flows through the drain conduit 81 into the conduit 22 to rejoin the solution circuit. After having its temperature reduced as indicated at 54 the cold gas enters the low temperature sharp freezing evaporator 55.

The liquid refrigerant discharged from the mid-condenser section 16 through the conduit 17 is passed in intimate heat exchange relationship with the lowest right hand U-shaped tray supporting section of the evaporator E as indicated at 56. This action reduces the temperature of the liquid in conduit 17 to a low value before it enters the evaporator 55.

The condenser is split with the section 16 between the sections 12 and 14 to insure that substantially all absorbent vapor will be condensed in the section 12 but sufficient refrigerant vapor will reach the section 16 to insure an adequate supply of refrigerant liquid to the evaporator 55 at all times.

The evaporator conduit 55 is large in diameter compared to the conduit forming the evaporator E. Conduit 55 is sloped slightly downwardly from the point at which the conduit 17 joins it to its point of connection with the conduit 53; consequently the liquid refrigerant supplied through the conduit 17 flows through the evaporator 55 by gravity in contact with and in counterflow relationship with the stripped cold inert gas supplied through conduit 53. The liquid evaporates into the extremely low concentration inert gas at very low temperatures, of the order of 0° F. for example, which is sufficiently low for the satisfactory preservation of sharp frozen food stuffs. Any unevaporable or unevaporated liquids which traverse the conduit 53 are conveyed therefrom to the refrigerant supply conduit for the principal evaporator by the drain conduit 58.

The inert gas which has traversed the evaporator 55 has its refrigerant vapor concentration increased, however, the absolute concentration of this gas is still low by ordinary standards and in fact approximates the concentration of the so-called lean inert gas which is discharged from the primary absorber A. Gas is conducted from the evaporator 55 through the conduit 59, the gas heat exchanger 52 and the conduit 60 to the suction inlet conduit 40 of the circulating fan thus completing the second inert gas circuit.

The proportion of the absorbing solution which is diverted through the low temperature absorber will depend upon the particular design of the apparatus, the design conditions, the temperatures to be maintained in the two evaporators and the relative refrigerating loads of the two evaporators. One satisfactory combination for a refrigerator having an eight cubic foot capacity with a one cubic foot sharp freezer compartment has been found to be to divert approximately 7% of the lean solution leaving the boiler to the low temperature absorber. Under these conditions the refrigerant concentration of the low temperature inert gas circuit has been between 4.5% and 6.5% by volume. These figures are illustrative only and are not to be taken as limiting in any sense.

Inert gas of maximum concentration in the inert gas circuit comprising evaporator 55 and absorber 33 is supplied to the gas pump along with the inert gas of minimum concentration in the primary circuit comprising the evaporator E and absorber A. Stated somewhat differently the rich gas in one circuit and the lean gas in the other undergo commingling in the suction chamber 41 of the circulating fan F. This is not objectionable in the present system because the refrigerant vapor concentration of the inert gas in the two circuits is approximately the same at this point. The total resistances of the two inert gas circuits are adjusted by suitable choices of conduit diameters to insure that the proper proportion of gas placed under pressure by the gas pump F is directed through the respective inert gas circuits.

Figure 2:
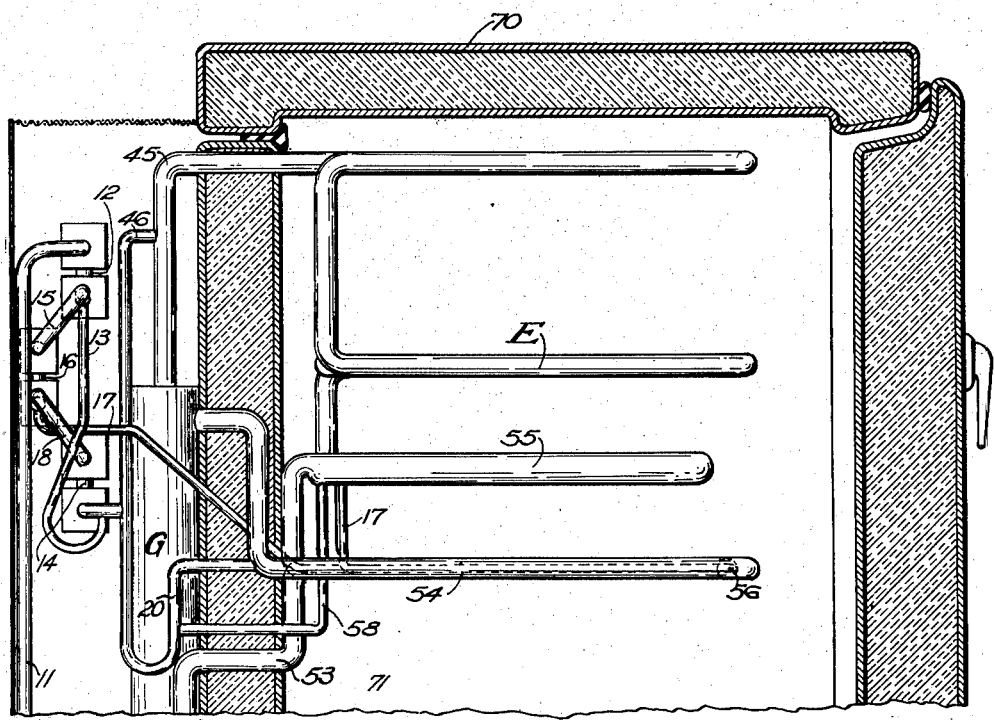
Figure 2 is a view in sectional elevation showing a portion of the refrigerating cabinet and the manner in which part of the apparatus schematically illustrated in Figure 1 is associated with the cabinet.

Referring now to Fig. 2 the arrangement of the condenser, evaporators and secondary absorber with respect to the cabinet is illustrated. The evaporators E and 55 are positioned within and adjacent the upper portion of an insulated refrigerating cabinet structure 70. The secondary absorber 33 is positioned in the lower rear corner of the food storage compartment 71 enclosed by the cabinet structure 70. The absorber 33 is cooled directly by the cold air in the compartment 71 and ultimately by the evaporator structure E.

The condenser structure comprises two condenser passes each for the condenser sections 12, 14 and 16. The condenser sections 12 and 14 which supply refrigerant to the evaporator E through the conduit 20 are positioned laterally of the condenser section 16 which supplies refrigerant liquid to the low temperature evaporator 55. By reason of this arrangement the condenser section 16 is traversed by cooling air unheated by heat of condensation.

Referring now to Figs. 1 and 2 the evaporators have been shown in the form of conduits shaped as they are shaped in an actual apparatus. The two side wings forming the separated parts of the evaporator E will be encased in suitable metallic housings with tray supporting shelves or plates overlying the two lower horizontal U-shaped sections of the evaporator E and with an evaporator top plate overlying the two top horizontal U-shaped sections of the evaporator E. The low temperature evaporator 55 will be encased in an insulated compartment positioned between the spaced metallic housings encasing the spaced sections of the evaporator E. The low temperature chamber housing the low temperature evaporator 55 is indicated by the dashed lines C in Figure 1. This arrangement of evaporating elements and housing is described and claimed in my copending application Serial No. 694,370, filed August 31, 1946, now United States Patent No. 2,520,539, dated August 29, 1950, and is omitted from the drawing, except for the dashed lines C, to permit clear illustration of the refrigeration system circuit arrangements.

Figure 3:
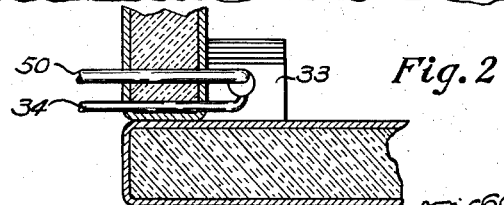
Figure 3 is a partial sectional elevational view of a modified form of gas pumping apparatus.
Figure 3:
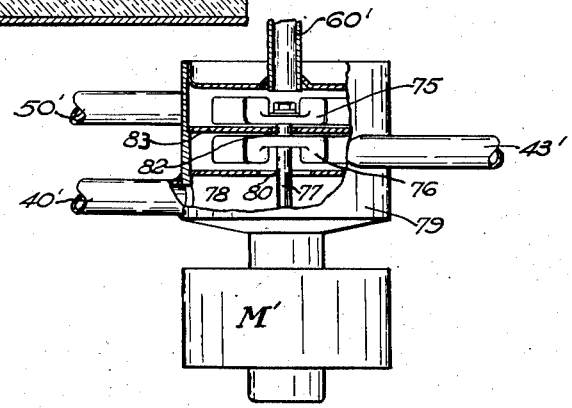

A modified form of the invention is illustrated in Fig. 3. This form of the invention differs from the form of the invention illustrated in Figs. 1 and 2 only with respect to the arrangement of the gas pumping means, therefore only that portion of the apparatus has been illustrated. The gas conduits conveying gas to and from the gas pumping means are given the same reference characters as the corresponding conduits of Fig. 1 distinguished by the addition of primes. In this form of the invention the motor M' drives a pair of gas pumps here illustrated as taking the form of a pair of centrifugal fans 75 and 76 which are fixedly secured in spaced back to back relation upon the shaft 77 within a fan housing 79. The suction conduit 40' of the principal inert gas circuit supplies gas to the suction chamber 78 which communicates with the central part of the fan through the central opening 80 in the plate separating the chamber 78 from the chamber housing fan 76. The gas which is placed under pressure by the fan 76 discharges through the conduit 43'. The suction conduit 60' of the secondary inert gas circuit discharges gas into the central portion of the upper fan 75. The fan 75 places this inert gas under pressure and discharges the gas under pressure through the conduit 59'. A central partition 83 forms the common wall between the chambers housing fans 75 and 76. This partition thus extends between the central plates of the fans which are opposite their gas inlets. The partition 83 is provided with a central opening 82 through which the shaft 77 passes. This opening is slightly larger than the diameter of the shaft 77 to provide a bleed and pressure equalizing passageway between the two inert gas circuits. During the operation of the device the fans do not tend to cause a flow of inert gas in either direction through the opening 82 because of their back to back relation. Any flow which occurs through opening 82 is simply gas which is induced to flow in that manner by a pressure differential created between the two gas circuits.

This form of the invention is preferred for use in particular installations in which the lowest refrigerant concentration of the principal inert gas circuit and the highest refrigerant concentration in the low temperature inert gas circuit are not approximately equal. This condition may arise in particularly installations where the desired proportion of refrigerating load between the two evaporators precludes such an equalization of concentration. Additionally it may in some instances be desirable to place the circulating pump in a relative portion of one inert gas circuit or the other different from that illustrated in Fig. 1. In this event the arrangement of Fig. 3 is preferred because it is substantially independent of the relative concentrations of inert gas in the two fan chambers.

Even where the minimum concentration of refrigerant in the inert gas in the principal inert gas circuit is substantially equal to the maximum concentration of refrigerant in the secondary low temperature inert gas circuit, this form of the invention is to be preferred where the additional cost of the extra gas pump is justified by the economy and improved performance achieved by not heating the cold rich gas in the secondary inert gas circuit to the temperature of the lean gas discharged from the absorber of the principal inert gas circuit. In the Fig. 1 form of the invention the two streams of gas commingle which raises the temperature of the gas supplied to the absorber 33 approximately to the temperature of the gas discharged from the absorber A. In the Fig. 3 form of the invention there is very little heat transfer between the two gas streams so that the gas which is supplied to the absorber 33 is not appreciably warmed above the temperature at which it discharges from the gas heat exchanger 52.

The present invention provides a construction by which a three fluid absorption refrigerating system is readily modified to accommodate the modern demands for extremely low temperature refrigeration to preserve sharp frozen food stuffs without however unduly complicating the apparatus. Due to the wide variations between the maximum refrigerant vapor concentration of the normal refrigerating inert gas circuit and the minimum refrigerant vapor concentration in the low temperature inert gas circuit it is most desirable to separate the apparatus into two substantially independent circuits. The present invention permits the attainment of this desirable objective while retaining the advantages of positive propulsion of the inert gas which is achieved by a single pumping mechanism common to the two inert gas circuits.

While I have illustrated and described the invention in considerable detail, it is to be understood that various changes may be made in the arrangement, proportion and construction of parts without departing from the spirit of the invention or the scope of the appended claims.

I claim:

1. Absorption refrigerating apparatus comprising a first inert gas circuit including an evaporator and an absorber, a second inert gas circuit including a second evaporator and a second absorber, said second absorber being arranged to be cooled by said first evaporator, said second inert gas circuit including means for conveying inert gas from said second absorber to said second evaporator in heat exchange relation with said first evaporator, a gas circulating pump in said inert gas circuits connected to receive inert gas from said first absorber and said second evaporator and to discharge inert gas to said first evaporator and said second absorber.

2. Refrigerating apparatus comprising first and second evaporators, first and second absorbers, said second absorber being arranged to be cooled by said first evaporator, a generator, means for conducting lean absorbing solution from said generator to said absorbers, means for condensing a portion of the refrigerant vapor and substantially all absorption solution vapor evolved in said generator and supplying the condensate to said first evaporator, means for condensing refrigerant vapor which traverses said first condensing means and for passing such condensate in heat exchange with said first evaporator and to said second evaporator, gas pumping means, means for flowing gas under pressure in a first path of flow from said pumping means serially through said first evaporator and said first absorber and back to said pumping means, and means for flowing gas under pressure in a second path of flow from said pumping means serially through said second absorber and then in heat exchange with said first evaporator and then through said second evaporator and back to said pumping means.

3. Refrigerating apparatus of the pressure equalized type comprising a first inert gas circuit including an evaporator, a second inert gas circuit including an evaporator and an absorber arranged to be cooled by the evaporator in said first inert gas circuit, gas pumping means in each of said inert gas circuits and common means for operating said gas pumping means.

4. Absorption refrigerating apparatus comprising a first inert gas circuit including an evaporator, an absorber and a gas pumping means; a second inert gas circuit including an evaporator, an absorber and a gas pumping means; common means for driving said gas pumping means, and a pressure equalizing connection between said gas pumping means.

5. Refrigerating apparatus comprising a first inert gas circuit including an evaporator and an absorber, a second inert gas circuit including an evaporator and an absorber; gas pumping means in each of said inert gas circuits for circulating inert gas therethrough comprising a pair of fan chambers separated by a common wall, one of said chambers being connected in said first inert gas circuit and the other of said chambers being connected in said second inert gas circuit, a pair of centrifugal fans arranged in back to back relation on opposite sides of said common wall, a single drive shaft carrying said fans and extending through an opening in said common wall of larger area than the cross section of said shaft and means for driving said shaft, means for supplying refrigerant liquid to said evaporators and means for supplying absorbing solution to said absorbers.

6. Absorption refrigerating apparatus comprising first and second evaporators, first and second absorbers, inert gas circulating means, means forming a first inert gas circuit including said gas circulating means for flowing inert gas from said first absorber to said first evaporator and back to said first absorber, means forming a second inert gas circuit including said gas circulating means and otherwise distinct from said first inert gas circuit for flowing inert gas from said second absorber to said second evaporator and back to said second absorber, and means for supplying refrigerant liquid to said evaporators.

7. Apparatus according to claim 18 in which said gas circulating means comprises a pair of fan chambers having a common wall, a centrifugal fan in each of said chambers, said fans being mounted on a common shaft passing through said common wall, and an opening in said common wall around said shaft providing a pressure equalizing connection between said inert gas circuits.

8. Absorption refrigerating apparatus having a first and second evaporator, first and second absorbers, an inert gas pumping means, a generator, means for condensing refrigerant vapor evolved in said generator and for supplying condensate to said evaporators, means connecting said generator and said absorbers for circulation of absorbing solution therebetween, means forming a first circuit for inert gas in which inert gas flows from said first absorber to said gas pumping means and from said gas pumping means through said first evaporator back to said first absorber, and means forming a second inert gas circuit in which inert gas flows from said gas pumping means serially through said second absorber and said second evaporator and back to said gas pumping means.

9. Refrigerating apparatus of the pressure equalized type having a low temperature evaporator and a high temperature evaporator, means forming a circuit for absorbing solution including a generator and absorbing means, means for conducting inert gas from said absorbing means to said evaporators, a condenser structure having three condensing sections serially connected for flow of vapor therethrough, means for conducting vapors evolved in said generator to the first of said condensing sections, means for conducting condensate produced in the first and third condensing sections to said high temperature evaporator, means for conducting condensate formed in the second of said condensing sections to said low temperature evaporator and means for conducting liquid unevaporated in said high temperature evaporator to said absorbing solution circuit without traversing said low temperature evaporator.

10. In a refrigerator, a cabinet structure including a refrigerating chamber and a cooling air passageway, a refrigerating apparatus associated with said cabinet structure including a high temperature evaporator and a low temperature evaporator, means forming a circuit for absorbing solution including a generator and absorbing means, means for conducting inert gas from said absorbing means to said evaporators, a condenser structure in said cooling air passageway including three condensing sections serially connected for flow of vapor therethrough, the first and third of said sections being displaced laterally of the second of said sections so that said second section is traversed by cooling air previously unheated by heat of condensation, means for conducting condensate produced in the first and third condensing sections to said high temperature evaporator, means for conducting condensate formed in the second of said condensing sections to said low temperature evaporator, and means for conducting liquid unevaporated in said high temperature evaporator to said absoring solution circuit without traversing said low temperature evaporator.

11. Apparatus according to claim 8 including means in said second inert gas circuit for conducting inert gas flowing from said second absorber to said second evaporator in heat exchange with said first evaporator.

CURTIS C. COONS.

REFERENCES CITED

The following references are of record in the file of this patent:

UNITED STATES PATENTS

| Number | Name | Date |
|---|---|---|
| 2,194,505 | Kogel et al. | Mar. 26, 1940 |
| 2,240,176 | Coons et al. | Apr. 29, 1941 |
| 2,250,944 | Brace | July 29, 1941 |
| 2,260,939 | Hainsworth | Oct. 28, 1941 |
| 2,298,029 | Blomqvist | Oct. 6, 1942 |
| 2,315,356 | Siedle | Mar. 30, 1943 |
| 2,487,791 | Coons | Nov. 15, 1949 |
| 2,489,752 | Coons | Nov. 29, 1949 |